US005599078A

United States Patent [19]

Dechene et al.

[11] Patent Number: 5,599,078

[45] Date of Patent: Feb. 4, 1997

[54] ANTI-TIP DEVICE FOR FILE CABINETS

[75] Inventors: Guy Dechene, Laval; Michel Pichereau, Beaconsfield, both of Canada

[73] Assignee: ALB Industries Ltd., Montreal, Canada

[21] Appl. No.: 555,162

[22] Filed: Nov. 8, 1995

[51] Int. Cl.$^{6}$ .................................................... G05B 65/46

[52] U.S. Cl. ........................................... 312/221; 312/217

[58] Field of Search .................................... 312/215, 216, 312/217, 218, 219, 220, 221, 222

[56] References Cited

U.S. PATENT DOCUMENTS

| | | | |
|---|---|---|---|
| 4,239,309 | 12/1980 | De Fouw et al. . | |
| 4,272,138 | 6/1981 | Stark . | |
| 4,355,851 | 10/1982 | Slusser . | |
| 4,429,930 | 2/1984 | Blouin . | |
| 4,447,098 | 5/1984 | Parker . | |
| 4,637,667 | 1/1987 | Reid et al. . | |
| 4,889,396 | 12/1989 | Mitchell et al. | 312/217 |
| 5,303,994 | 4/1994 | Elsholz | 312/221 |
| 5,333,949 | 8/1994 | McGregor | 312/221 |

FOREIGN PATENT DOCUMENTS

| | | |
|---|---|---|
| 1175875 | 10/1984 | Canada . |
| 1282105 | 3/1991 | Canada . |

*Primary Examiner*—Peter M. Cuomo
*Assistant Examiner*—Gerald B. Anderson
*Attorney, Agent, or Firm*— Dressler, Goldsmith, Milnamow & Katz, Ltd.

[57] ABSTRACT

An anti-tip device is provided for use in cabinets having two or more drawers, for preventing more than one drawer from being opened simultaneously, thereby reducing the likelihood of the cabinet tipping over due to the force of multiple open drawers. The device comprises a series of bars and pivot members disposed within a vertical channel. The pivoting of one of the pivot members to its open position prevents the pivoting of members both above and below the open member. The pivot members engage the drawers of the cabinet such that a drawer may only be opened when its associated pivot member is pivotable to its open position.

13 Claims, 5 Drawing Sheets

ANTI-TIP DEVICE FOR FILE CABINETS

FIELD OF THE INVENTION

The invention relates to file cabinets or other cabinets with drawers which slide out, and in particular to a safety device and method for preventing multiple drawers from opening simultaneously.

BACKGROUND OF THE INVENTION

It is common for cabinets to have several drawers each of which may be filled with heavy files. When all drawers are closed, the mass of all the drawers is centred, and the file cabinet is very stable. However, when a drawer is pulled open, the weight of the drawer is removed from the centre, and there is a force created on the cabinet which acts away from the centre of mass of the cabinet. So long as there is sufficient weight in the remaining drawers to hold the cabinet vertical, the cabinet will not tip over. However, as more drawers are pulled open, the cabinet becomes increasingly unstable, and the likelihood of tipping increases. Tipping of a heavy file cabinet may cause serious injury to a person standing in front of the cabinet, or may cause damage to the file cabinet and its contents.

Various devices have been proposed to limit the number of drawers which can be open at the same time. For instance, in U.S. Pat. No. 4,272,138 an anti-tip device is disclosed which includes a segmented column consisting of a plurality of longitudinally extending snubber elements axially aligned in end-to-end abutting relation. The column extends adjacent to each drawer and the column, and/or the individual snubber elements are resiliently mounted within the cabinet to permit movement between a central equilibrium position and one of two opposite axially displaced positions. Each drawer carries on its side an activator rail which is disposed at right angles to the column. The tapered end of each activator rail is positioned so as to insinuate itself between two adjacent abutting snubber elements when the respective drawer is opened. The act of activator rail insinuation between adjacent snubber elements causes each of the snubber elements in the column to be displaced from a central equilibrium position to one of the two displaced positions. In their displaced positions, the snubber elements block opening of further drawers. In U.S. Pat. No. 4,637,667, a somewhat similar scheme is proposed in which a locking mechanism is also integrated into the design.

In U.S. Pat. No. 4,239,309 U-shaped hooks are provided on a vertical bar. The hooks engage the drawers and prevent them from opening when the hooks are displaced vertically. When a drawer is opened, a ramp mechanism on the side of the drawer slides the hook bar vertically engaging the remaining drawers, thus preventing any other drawer from opening.

These designs are complex, expensive to produce, and require manufacturing to precise tolerances.

Other designs rely on a set of bars disposed in a vertical channel of fixed length. In Canadian Patent 1,175,875 a set of vertical bars are provided, one of which is moved vertically upon the opening of a drawer such that no more vertical movement of any bar is possible, due to the fixed length of the channel for the bars. The movement of the bars is achieved by an independent cylindrical member disposed between the bars which is rotated by the opening of the drawer. The amount of space occupied between the bars by the member increases in its rotated state. This design depends upon accurate measurement of all the bars such that they all fit exactly in the length of the vertical channel when one drawer is opened. Further, the member must be rotated against the frictional force of both the bars above and below. U.S. Pat. No. 4,355,851 discloses a similar arrangement in which a rotating member engages a wedge disposed between the bars of a fixed length channel and forces the bars to slide until no more vertical play is present. Enough play is allowed such that only a single drawer may be opened. An excessive number of parts and close tolerances are required in both of these designs.

U.S. Pat. No. 4,429,930 has a rotating member which is attached pivotably to bars above and below the member such that rotation of the member causes vertical displacement of the bars. Again, the fixed vertical length of the channel in which the bars are located prevents further rotation of other members. This pivoting member is constructed from two different pieces, and is attached to both the bars above and below the pivot. This leaves little flexibility in the design of the pieces which fit in the channel because they are all physically linked together and complicate manufacture.

SUMMARY OF THE INVENTION

The present invention provides a novel, easily manufactured anti-tip device.

According to a broad aspect, the invention provides an anti-tip device for use in a cabinet, and a cabinet having the anti-tip device mounted therein, the cabinet comprising a housing; two or more drawers in the housing each having a post mounted thereon; a channel mounted in the housing adjacent said drawers, one side of said channel having a discrete opening of predetermined dimensions associated with each adjacent drawer; a bar of predetermined length associated with each adjacent drawer, each bar being slidingly retained in the channel with at least one end movably abutting an end of an adjacent bar, and each bar having a rigid tongue extending through one discrete opening; and a pivot member associated with each drawer having a post retaining channel and an arm, each pivot member being pivotably mounted in the housing such that it has a closed position in which the post of the associated drawer is retained in the post retaining channel and an open position in which said post is free to exit the post retaining channel; wherein opening of a drawer causes its post to engage its post retaining channel urging the pivot member to pivot to its open position, and wherein pivoting of the pivot member causes the arm to pivot in engagement with the tongue of the drawer's associated bar thereby slidingly displacing the bar and facilitating insertion of an end of the arm into the channel between adjacent bars, or between the end of a bar and the end of the channel; and when one pivot member is in its open position allowing opening of the drawer it is associated with, the displacement of tongues associated with other drawers is limited by engagement of the tongues with the periphery of the associated opening, engagement of an end of the associated bar with an abutting end of another bar, or engagement of an end of said bar with the arm of the pivot member which is in its open position, thereby preventing pivoting of the other pivot members and accordingly opening of more than one drawer; the channel can accommodate only one open pivot member or can partially accommodate two or more partially open pivot members, partially open pivot members not permitting the associated drawers from opening, thereby preventing two or more drawers from being opened simultaneously.

The device can be employed with vertically stacked drawers as described below or with horizontally aligned drawers. In the latter case the channel is mounted behind the drawers and the posts configured to interengage with a post retaining channel of a pivot member also mounted behind the drawers.

Flexibility in the design of the components allows the device to be easily integrated into any cabinet. For example, the pivot members may be mounted on the bars, or they may be attached directly to the cabinet housing. The shape and size of the tongues and pivot member arms can be varied and are not required to be within precise tolerance. The post retaining channels can be made wide enough to provide significant tolerance in the engagement and interaction with the posts on the drawers.

DESCRIPTION OF THE DRAWINGS

The invention will be further described by way of example with reference to the drawings in which.

DESCRIPTION OF PREFERRED EMBODIMENTS

For convenience, the invention will be described as applied to a four drawer lateral type file cabinet but the invention is not limited to use in such a cabinet.

Figure 1:
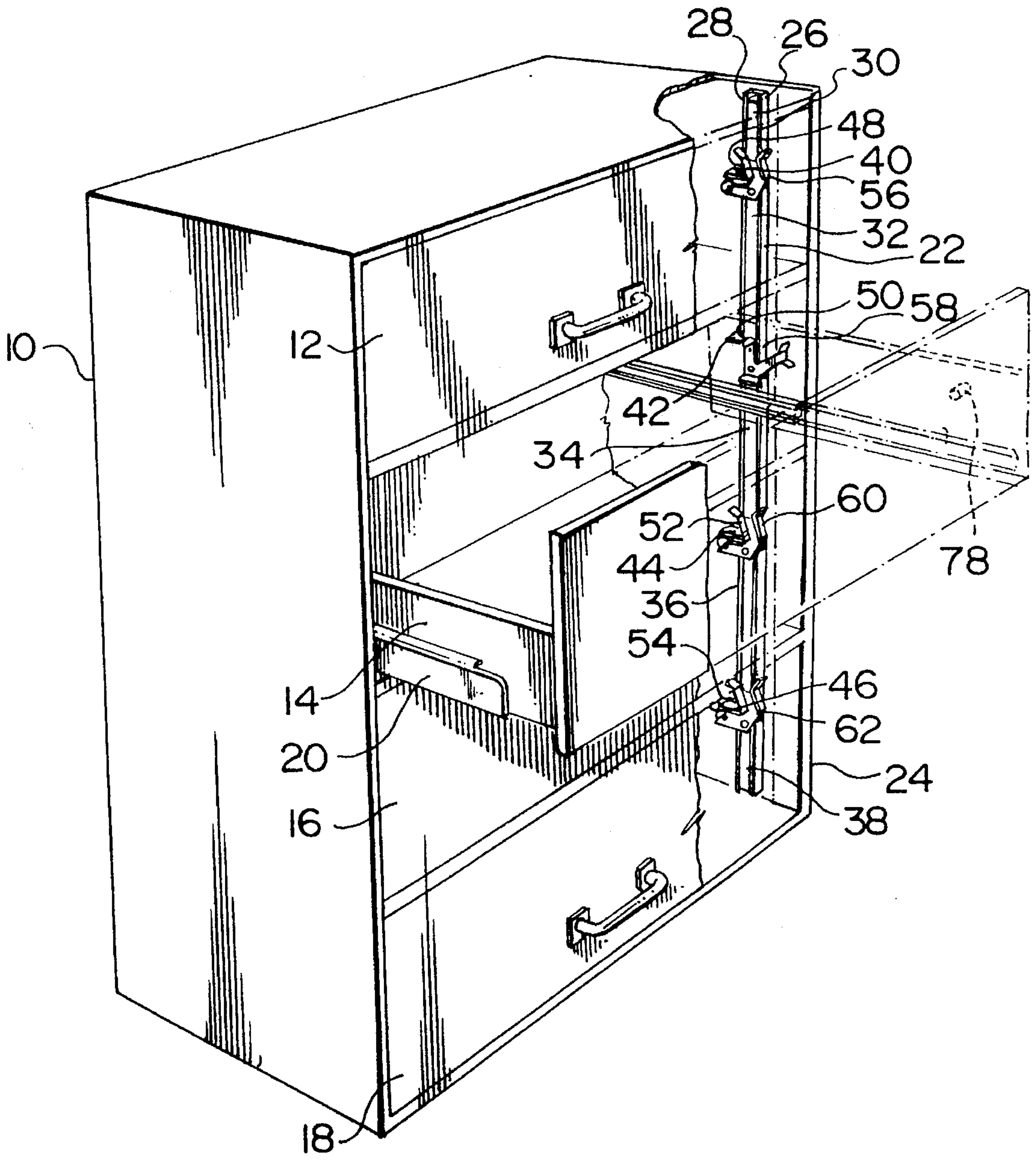
FIG. 1 is a perspective view of a file cabinet.

With reference to FIG. 1, there is shown a lateral type file cabinet 10 having a housing and four drawers 12,14,16,18. The drawers 12,14,16,18 are slidingly mounted within the housing for movement in and out of the housing through conventional mounting means 20. In the illustrated embodiment sliding rails are provided for supporting the drawers.

An anti-tip device is provided on the cabinet 10, and in engagement with the drawers 12,14,16,18. The anti-tip device includes a channel 22 mounted in the housing. The channel 22 may be of any suitable configuration. In the illustrated embodiment the channel has a flat back secured to the right inside 24 surface of the cabinet 10, and two perpendicular walls 26,28. The channel 22 may be constructed from a separate piece of material as illustrated in FIG. 1, or may be integrated into a structural member used to support the drawer mounting means and to provide strength for the cabinet.

In the illustrated embodiment there are four bars 30,32, 34,36 slidably located in the channel with at least one end of each bar movably abutting an end of an adjacent bar, the bars shown being approximately square in cross-section so as to fit in the channel. There will always be a number of bars in the channel at least as great as the number of drawers. In the illustrated embodiment, an additional bar 38 is provided for supporting the bottom pivot member, as discussed below. At the bottom of each of the bars (except the bottom bar), a rigid tongue 40,42,44,46 extends out of the channel 22 through a corresponding discrete opening 48,50,52,54 of predetermined dimensions in one of the walls 28 of the channel. The tongues 40,42,44,46 are rectangular in shape, and have an upward slant as they extend away from the bars. This particular shape and angle are not essential however. The combined length of the bars shown (not including the additional bottom bar) extends from the bottom of the bottom discrete opening 54 to beyond the top of the top discrete opening 48. The bars 30,32,34,36,38 are held in the channel 22 either by the drawer mounting means 20, or by separate tabs which cross the channel. Alternatively, the channel could be constructed to self-contain the bars.

Four cams or pivot members 56,58,60,62 are mounted in the housing, one pivot member being mounted in association with each of the drawers. These may be mounted pivotably to the side of the cabinet, or near the top of the each bar except the top bar as illustrated.

Figure 2:
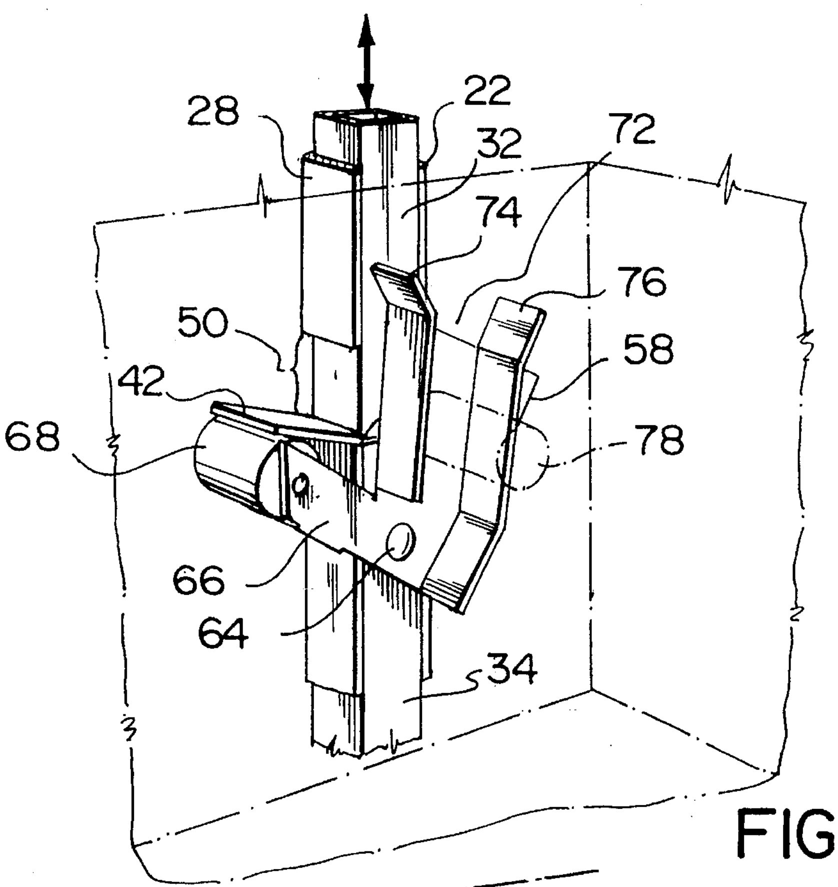
FIG. 2 is a perspective view of a pivot member forming part of the file cabinet of FIG. 1, the pivot member being shown in the closed position.

The further details of the pivot members 56,58,60,62 will be described with reference to FIG. 2 in which one of the pivot members 58 is shown in its closed position and FIG. 3 which shows a pivot member in its open position. The pivot member 58 is mounted near the top of a bar 34 with a pivot 64 permitting rotation of the member 58 about that pivot. Each pivot member 58 has an arm 66 which extends at approximately the same angle as the tongue 42 on the bar above 32. Each arm has an end which may be a cylindrical sliding member 68 as illustrated, and which has approximately the same width as the bars. A stopper or tab 70 extending in the direction of the sliding member 68 from the arm 66 may be provided to prevent the over-counter-clockwise rotation of the member 58 while it is in its closed position. While the pivot member 58 is in its closed position, the bar above 32 rests on the top of the bar below 34. The tongue 42 of the bar above 32 is protruding from the channel 22 near the bottom of the discrete opening 50. The pivot member 58 also includes a post retaining channel 72 constructed from two walls 74,76 which extend in a direction perpendicular to the side wall of the cabinet. This post retaining channel 72, in engagement with a post 78 to be described below, also prevents over-counter-clockwise rotation of the pivot member 58.

Figure 3:
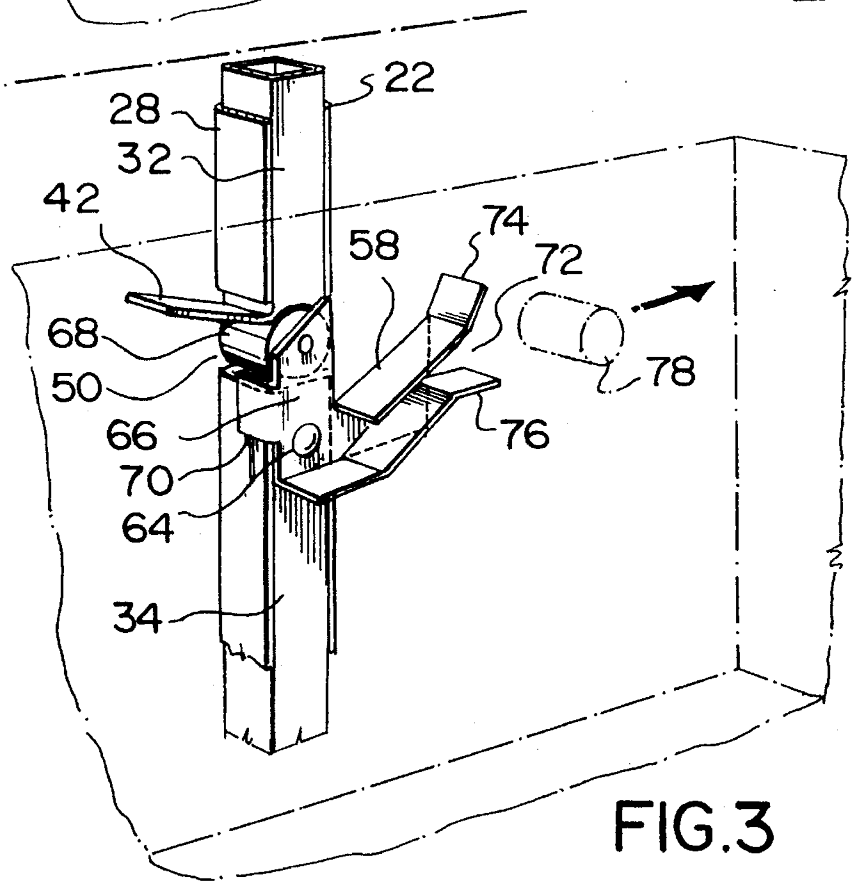
FIG. 3 is a perspective view of the pivot member of FIG. 2 in the open position.

In FIG. 3, the pivot member 58 has been rotated into its open position. In this case, the bar above 32 has been displaced upwards by the sliding member 68 the distance necessary to accommodate the sliding member 68 of the pivot member 58 attached to the bar below 34 in the channel 22. In order to permit pivoting of the sliding member 68 into the channel 22, the rectangular discrete opening 50 is provided in one wall 28 of the channel for each sliding member, as discussed above. In the illustrated embodiment, no opening is provided on the opposite side of the channel. This prevents over-rotation of the pivot member 58 in the clock-wise direction. However, the tab 70 or the top of the bar 34 to which the pivot member 58 is mounted may also serve this purpose. While the pivot member 58 is in its open position, the bar above 32 rests on the sliding member 68 which is now located in the channel 22 directly above the bar 34 upon which it is mounted. The tongue 42 of the bar above 32 is now protruding at the top of the discrete opening 50.

Figure 4:
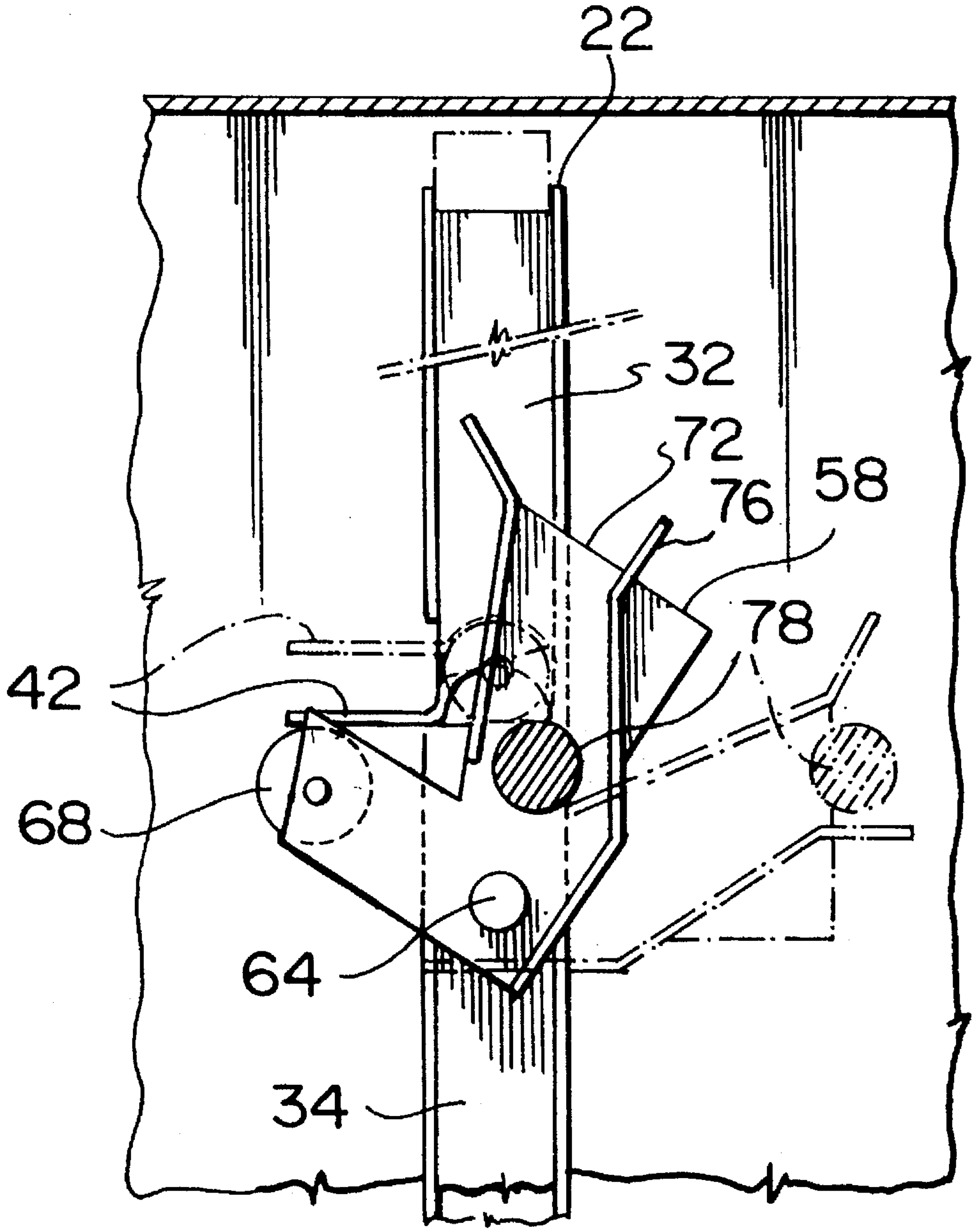
FIG. 4 is a side elevation of the pivot member of FIG. 2 in the closed position with the open position shown in phantom.

FIG. 4 shows a side elevation of the one of the pivot members 58 in its closed position, and shows a post 78 located in the post retaining channel 72. This post is mounted on the associated drawer as shown in FIG. 1, and as discussed further below. The illustrated post is cylindrical in shape, which is preferred because of the ease with which it can slide. However, posts of other shapes may be used. The open position of the pivot member 58 is shown in phantom showing the cylindrical post 78 leaving the post retaining channel 72. Upon rotation of the pivot member 58, the cylindrical sliding member 68 slides along the surface of the tongue 42 of the bar above 32, and forces the bar above to slide upwards, thereby making room in the vertical channel 22 for the sliding member 68. Although the sliding member 68 is shown with a cylindrical cross section, and the tongue 42 is rectangular in shape, the important feature is that the sliding member can slide against the tongue so as to urge the associated bar out of the way. Thus, other shapes and sizes may easily be utilized for these components.

Each drawer has a post 78 which is permanently installed on one side of the drawer so as to sit in the post retaining channel 72 of a corresponding pivot member 58 when the drawer is in a closed position. When a drawer is moved towards an open position, the post 78 disengages from the post retaining channel 72 of the pivot member 58 and moves out of the cabinet together with the drawer. More particularly, as the post 78 moves with the drawer, it engages the channel wall 76 and thereby urges the pivot member 58 to pivot from its closed position to its open position as shown in phantom in FIG. 4.

Once a single drawer has been opened, the anti-tip device prevents further drawers from being opened. The device also prevents the simultaneous opening of two or more drawers. The manner in which this is accomplished by the illustrated embodiment will be described with reference to FIGS. 5 and 6.

Figure 5:
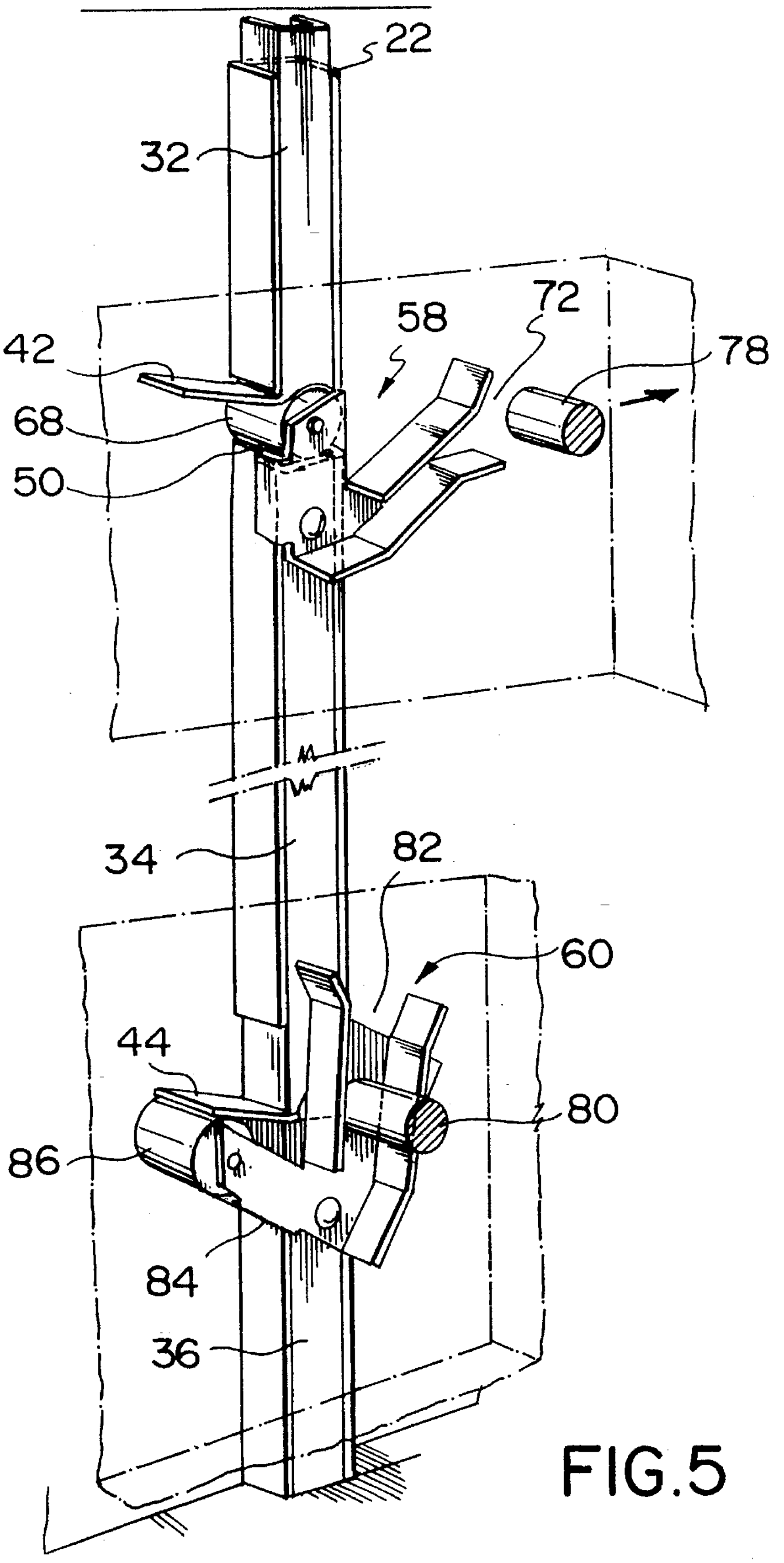
FIG. 5 shows a pair of pivot members forming part of the file cabinet of FIG. 1 in which the upper pivot member is in the open position and the lower pivot member is in the closed position.

In FIG. 5, two pivot members 58,60 are shown. The top member 58 has an open position, corresponding to an open drawer, while the bottom member 60 has a closed position corresponding to a closed drawer. The post 78 of the open drawer is seen exiting the post retaining channel 72 of the upper pivot member 58, while the post 80 of the closed drawer is seen retained by the post retaining channel 82 of the lower pivot member 60. Also shown are three bars, a lower bar 36, a central bar 34 and an upper bar 32. The lower bar 36 and the central bar 34 have pivot members 60,58 near their tops, while the central bar 34 and the upper bar 32 have tongues 44,42 near their bottoms. The disposition of the sliding member 68 on the pivot member 58 of the central bar 34 in the channel 22 has caused the upper bar 32 to slide upwards, and the tongue 42 of that bar be maintained at or near the top of the corresponding discrete opening 50 in the side of the channel 22. There is very limited room for the upper bar 32 to move any further in the upwards direction since the tongue 42 engages with the top of the discrete opening 50. When a user attempts to pull out the drawer below, this requires the lower pivot member 60 to rotate to free the post 80. For the pivot member 60 to be able to rotate, the central bar 34 must be able to slide vertically upwards to allow the channel 22 to accommodate the arm 84 and sliding member 86 of the lower pivot member 60. This is not possible however, because the sliding member 68 of the pivot member 58 of the central bar 34 is located in the channel 22 against the bottom of the upper bar 32, which can no longer slide upwards, because its tongue 42 is at the top of the discrete opening 50 in the channel 22. Thus the bar below it 34, and all of the other bars below it, are prevented from moving upwards. Because the bars cannot move, the corresponding post retaining channels on the pivot members are held in their closed positions which do not allow the posts of the corresponding drawers to disengage, this disengagement being required for the drawers to open. In summary, the single tongue of the bar above an open pivot member (corresponding to an open drawer) engaging the discrete opening in the channel prevents all drawers below this drawer from being opened.

Figure 6:
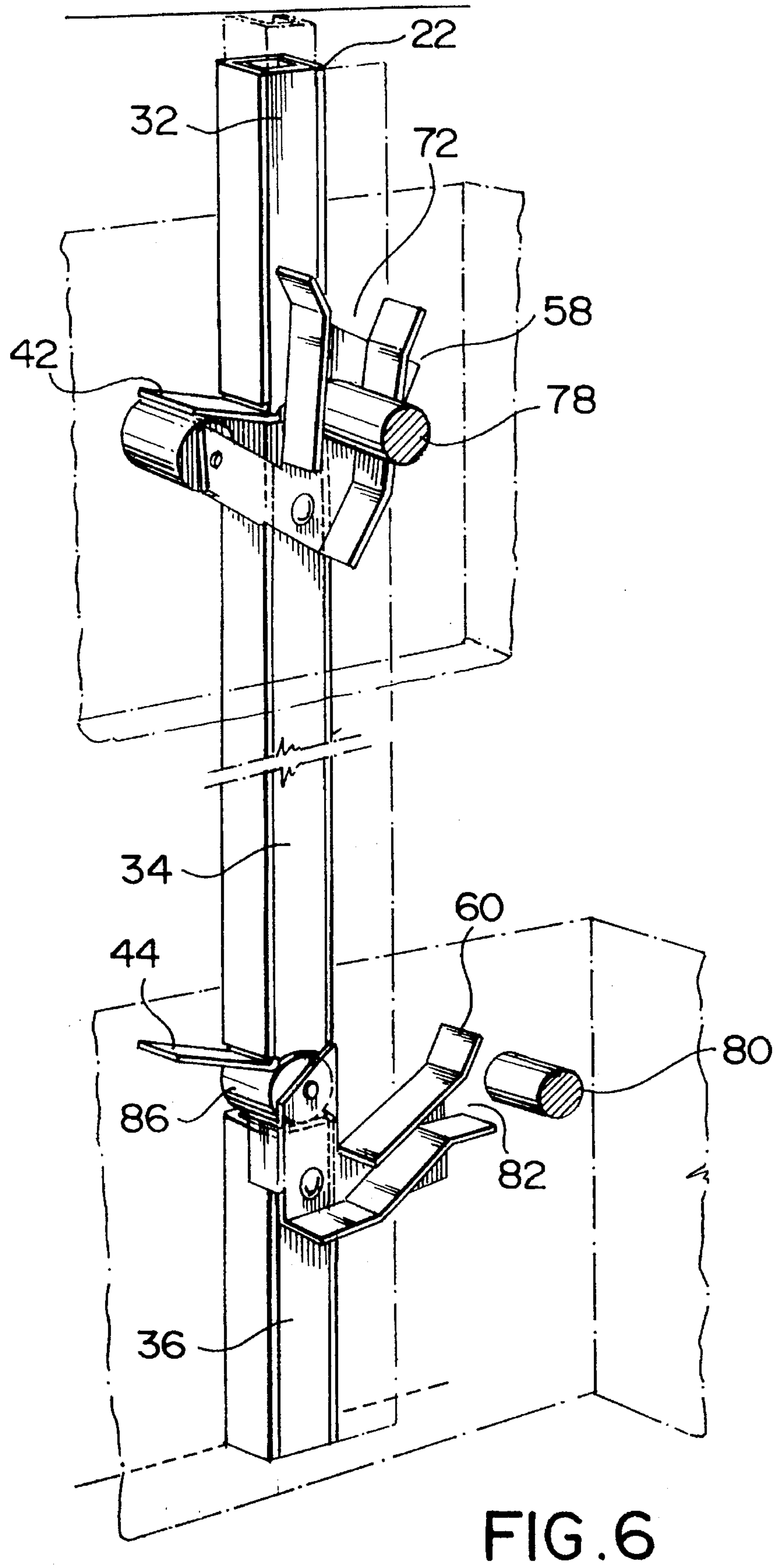
FIG. 6 shows the pair of pivot members of FIG. 5 in which the upper pivot member is in its closed position and the lower pivot member is in its open position.

In FIG. 6, two pivot members 58,60 are shown. The top member 58 has a closed position, corresponding to a closed drawer, while the bottom member 60 has an open position corresponding to an open drawer. The post of the closed drawer 78 is shown retained by the post retaining channel 72 of the upper pivot member 58, while the post 80 of the open drawer is shown exiting the post retaining channel 82 of the lower pivot member 60. As before, also shown is a lower bar 36, a central bar 34, and an upper bar 32. The lower bar 36 and the central bar 34 have pivot members 60,58 near their tops, while the central bar 34 and the upper bar 32 have tongues 44,42 near their bottoms. The disposition of the cylindrical sliding member 86 of the lower pivot member 60 in the channel 22 has caused the central bar 34 and all bars above it including the upper bar 32 to slide upwards, and the tongue 44 of the central bar and all bars above it attain positions at or near the top of the corresponding discrete openings in the side of the channel 22 for the bars. There is no more room for the upper bar 32 to move any further in the upwards direction because the top of the discrete opening 50 in the channel 22 will engage with the tongue 42. Thus, when a user attempts to pull out the drawer above, this requires the upper pivot member 60 to rotate, and requires the upper bar 32 to slide vertically to accommodate the sliding member 68. This is not possible however, because the tongue 42 of the upper bar 32 is already up against the discrete opening 50 in the channel 22, and cannot move any further. The post retaining channels on the pivot members above the open pivot member are held in their closed positions which do not allow the posts on the corresponding drawers to disengage, this disengagement being required for the drawers to open. In summary, the opening of a lower pivot member causes all of the pivot members and tongues above to move vertically such that all of the tongues come close to engaging the upper side of their corresponding openings in the channel, thereby preventing all of the drawers above the open drawer from being opened.

The anti-tip mechanism of the invention, in addition to preventing a second drawer from being open after a first drawer has been opened, also prevents the simultaneous opening of two or more drawers. There is sufficient space in the channel for one completely open pivot member. It is possible that two or more pivot members may be partially open, but the post retaining channels are designed such that they will not allow the corresponding posts to disengage unless fully open. As such, when it is attempted to open two or more drawers simultaneously, no drawers will be allowed to open.

It should be further understood that although in the description the tongues are always described as being at the top or the bottom of the rectangular discrete openings, some limited movement in the tongues and bars may be permitted after a drawer has been opened, so long as the amount of movement is not sufficient to allow rotation of the post retaining channels corresponding to closed drawers to the point that the post of the corresponding drawer can escape its post retaining channel.

In a variant of the principle embodiment described above, a locking mechanism may be added. The lock (not shown) is installed at the top of the anti-tip device. While the lock is open, the bars in the anti-tip device are free to slide as described above. While the lock is closed, the top bar is prevented from sliding, thereby preventing any of the other bars from sliding, and thereby preventing any of the drawers from being opened.

A spring (not shown) may be added between the top of the top bar and the top of the file cabinet to add an element of resiliency to the manner in which the bars slide. This would reduce any clanking noise which may result from the anti-tip device, and would make the operation smoother.

We claim:

1. A cabinet comprising a) a housing;

b) two or more drawers in the housing each having a post mounted thereon;

c) a channel mounted in the housing adjacent said drawers, one side of said channel having a discrete opening of predetermined dimensions associated with each adjacent drawer;

d) a bar of predetermined length associated with each adjacent drawer, each bar being slidingly retained in the channel with at least one end movably abutting an end of an adjacent bar, and each bar having a rigid tongue extending through a respective one of the discrete openings; and e) a pivot member associated with each drawer having a post retaining channel and an arm, each pivot member being pivotably mounted in the housing such that it has a closed position in which the post of the associated drawer is retained in the post retaining channel and an open position in which said post is free to exit the post retaining channel;

wherein:

i) opening of a drawer causes its post to engage its post retaining channel urging the pivot member to pivot to its open position, and wherein pivoting of the pivot member causes the arm to pivot in engagement with the tongue of the drawer's associated bar thereby slidingly displacing the bar and facilitating insertion of an end of the arm into the channel between adjacent bars, or between the end of a bar and the of the channel; and ii) when one pivot member is in its open position allowing opening of the drawer it is associated with, the displacement of tongues associated with other drawers is limited by engagement of the tongues with the periphery of the associated opening, engagement of an end of the associated bar with an abutting end of another bar, or engagement of an end of said bar with the arm of the pivot member which is in its open position, thereby preventing pivoting of the other pivot members and accordingly opening of more than one drawer; and iii) the channel can accommodate only one open pivot member or can partially accommodate two or more partially open pivot members, partially open pivot members not permitting the associated drawers from opening, thereby preventing two or more drawers from being opened simultaneously.

2. The cabinet of claim 1 wherein the end of the arm is a cylindrical sliding member which facilitates sliding along the tongue of the associated bar and insertion into the channel.

3. The cabinet of claim 1 wherein the tongues are attached at one end of the associated bars.

4. The cabinet of claim 3 further including an additional bar disposed in the channel such that all the bars with tongues have an adjacent bar proximate the tongue, and wherein the pivot members are mounted pivotably near the end of said adjacent bars.

5. The cabinet of claim 1 further including a resilient means mounted at one end of the channel for biasing the bars in a predetermined direction.

6. The cabinet of claim 1 further including a locking mechanism which limits movement of the bars when it is locked, thereby preventing the opening of any adjacent drawers.

7. The cabinet of claim 1 further including stoppers for preventing pivoting of pivot members past the close position in a direction away from the open position.

8. The cabinet of claim 1 in which the channel, discrete openings, bars and tongues are rectangular in shape.

9. The cabinet according to any one of claims 1 to 8 wherein the drawers are vertically stacked, and the channel is mounted on the inside of one side of the cabinet, and the posts are mounted on the outside of a corresponding side of the drawers.

10. The cabinet according to any one of claims 1 to 8 wherein the drawers are side by side, the channel is mounted on the inside of the bottom of the cabinet, and the posts are mounted on the outside bottom of the drawers.

11. The cabinet of claim 9 wherein the channel is rectangular in cross section with an open front facing the adjacent drawers and wherein drawer mounting means extend across the open front and serve to retain the bars in said channel.

12. An anti-tip device for use in a cabinet having two or more adjacent drawers in a housing, each drawer having a post mounted thereon, the anti-tip device comprising a) a channel for mounting in the housing adjacent two or more of said drawers, one side of said channel having a discrete opening of predetermined dimensions associated with each adjacent drawer;

d) a bar of predetermined length associated with each adjacent drawer, each bar being slidingly retained in the channel with at least one end movably abutting an end of an adjacent bar, and each bar having a rigid tongue extending through one of said discrete openings; and e) a pivot member associated with each adjacent drawer and having a post retaining channel member and an arm, each pivot member being pivotably mountable in the housing such that it has a closed position in which the post of the associated drawer is retained in the post retaining channel and an open position in which said post is free to exit the post retaining channel and such that pivoting a pivot member to its open position when the anti-tip device is installed in the cabinet, causes the arm to pivot in engagement with the tongue of a associated bar thereby slidingly displacing said bar and facilitating insertion of an end of the arm into the channel either between adjacent bars or between the end of a bar and an end of the channel;

wherein:

f) when one pivot member is in its open position the displacement of tongues associated with other pivot members is limited by engagement of the tongues with the periphery of the associated opening, engagement of an end of the associated bar with an abutting end of another bar, or engagement of an end of said bar with the arm of a pivot member, thereby preventing pivoting of the other pivot members; and g) the channel can accommodate only one open pivot member or can partially accommodate two or more partially open pivot members, partially open pivot members not permitting the associated drawers from opening, thereby preventing two or more drawers from being opened simultaneously.

13. A cabinet of the type having a housing with at least two horizontally movable drawers mounted therein, and having an anti-tip device preventing more than one drawer from being opened at one time, the anti-tip device comprising:

a) a vertically disposed channel on one side of the cabinet having a rectangular cross section, and one open side and three solid sides, one solid side being attached to the side of the cabinet and the other two solid sides being defined by walls protruding from the side of the cabinet towards the interior of the cabinet, one of the walls having one discrete rectangular opening through it associated with each of drawer;

b) a plurality of vertically stacked bars slidably disposed within the channel, numbering one more than the number of drawers, all of the bars except the bottom bar having a tongue which extends through one of the openings, thereby preventing sliding of the bars in an upward direction beyond the point where the tongue engages a top side of the corresponding rectangular opening;

c) a pivot member mounted pivotably about a pivot axis at the top of each bar except the top bar, each pivot member having a post retaining channel and an arm, said arm including an end portion which is parallel to the pivot axis, the pivot members being pivotable from a closed to an open position and wherein upon pivoting of a pivot member from its closed to its open position the arm of that pivot member engages the tongue of the bar above said pivot member, urging all of the bars above said pivot member to move upward and the end of said pivot member to be inserted in the channel under said bars;

e) a post mounted on each of the drawers to engage and be retained in the post retaining channel on a corresponding pivot member in the closed position, and being releasable from the post retaining channel when the pivot member pivots to its open position;

whereby the opening of a drawer causes the post mounted thereon to rotate the corresponding pivot member from its closed position to its open position, causing all of the bars above the bar with the open pivot member to slide vertically until their tongues come close to hitting the top of their corresponding rectangular openings, preventing any significant further vertical displacement of any of the bars, the tongues of said bars preventing the pivoting of the pivot members above the open pivot member, thus preventing the opening of any drawers above the open drawer; and whereby bars below the bar with the open pivot member and associated tongues are prevented from sufficient vertical displacement by engagement with the bar with the open pivot member mounted thereon, and wherein said tongue preventing the pivoting of pivot members below the open pivot member, thus preventing the opening of any drawers below the open drawer; and whereby the channel can accommodate only one open pivot member or can partially accommodate two or more partially open pivot members, partially open pivot members not permitting the associated drawers from opening, thereby preventing two or more drawers from being opened simultaneously.

* * * * *